United States Patent [19]

Lee

[11] Patent Number: 5,227,867
[45] Date of Patent: Jul. 13, 1993

[54] APPARATUS FOR LINE-ALTERNATING INTERPOLATION OF CHROMA SIGNALS

[75] Inventor: Chang-jun Lee, Seoul, Rep. of Korea

[73] Assignee: Samsung Electronics Co., Ltd., Kyunggi-do, Rep. of Korea

[21] Appl. No.: 807,588

[22] Filed: Dec. 16, 1991

[30] Foreign Application Priority Data

Dec. 14, 1990 [KR] Rep. of Korea ............ 90-20594[U]

[51] Int. Cl.$^5$ ........................ H04N 9/47; H04N 11/22
[52] U.S. Cl. ........................................ 358/14; 358/11; 358/18
[58] Field of Search ............ 358/11, 14, 18, 30, 358/31, 13

[56] References Cited

U.S. PATENT DOCUMENTS

| | | | |
|---|---|---|---|
| 4,516,151 | 5/1985 | Stahler | 358/14 |
| 4,796,085 | 1/1989 | Shinada | 358/11 |
| 4,853,765 | 8/1989 | Katsumata et al. | 358/31 |
| 5,051,818 | 9/1991 | Mishima | 358/31 |
| 5,093,714 | 3/1992 | Hashimoto | 358/11 |

FOREIGN PATENT DOCUMENTS 0236885 9/1989 Japan.

Primary Examiner—James J. Groody
Assistant Examiner—Jeffrey S. Murrell
Attorney, Agent, or Firm—Rothwell, Figg, Ernst & Kurz

[57] ABSTRACT

An apparatus for line-alternating interpolation of chroma signals in a MUSE decoder for a high definition (HD) television can simultaneously transmit color difference signals such that a color difference signal of an untransmitted scanning line is restored using the color difference signal of a neighboring scanning line of a currently transmitting scanning line. In the apparatus, the color difference signals alternately inputting every scanning line through an input terminal, are delayed for periods of one horizontal line, so that the two signals which are most similar to the presently transmitting color difference signal among the delayed color difference signals are added together, and the two signals which are most dissimilar to the original signal are also added together. Therefore, more weight is given to the resultant sum of the similar signals to restore the untransmitted color difference signal, so that two color difference signals most similar to the original color are formed to be simultaneously transmitted.

3 Claims, 3 Drawing Sheets

APPARATUS FOR LINE-ALTERNATING INTERPOLATION OF CHROMA SIGNALS

BACKGROUND OF THE INVENTION

The present invention relates to an apparatus for line-alternating interpolation of chroma signals, and particularly to an apparatus for line-alternating interpolation of chroma signals in a muse decoder for a high definition television, wherein a color difference signal component which is not yet transmitted on a current scanning line can be obtained by using input color difference signal components of a plurality of peripheral scanning lines, which are offset between lines and line-alternated.

Current television systems differ in their number of scanning lines, aspect ratios, scanning methods, and the like. Each country specifies its standard television system method for displaying the image signal on the screen, e.g., NTSC, PAL, and SECAM systems, etc. Also, current television systems have limited resolution, which has led to developments being advanced toward a system with resolution superior to that of current television systems.

A recently developed television system having excellent resolution is a high definition television (HDTV) system referred to as a multiple sub-Nyquist sampling encoding (MUSE) system, developed in Japan.

Among the foregoing television systems, the NTSC system transmits a luma signal Y and two color difference signals R-Y and B-Y loaded on every line. Although the usable bandwidth in the NTSC system is 6 MHz, in practice, the broadcasting station uses 4.5 MHz as the transmission bandwidth. This is because, among the bandwidths of the image signals, that of the chroma signal is 4.2 MHz and the audio signal's bandwidth is 4.5 MHz. However, in the MUSE system, since the bandwidth of the image signal is made to be 20 MHz, but is compressed to 8 MHz at the broadcasting station before transmission, the luma signal Y and a single color difference signal are transmitted in every line in order to compress the data to be transmitted.

Accordingly, to recreate a better high definition image, it is necessary to interpolate the untransmitted signal into each line. Thus, development of an interpolating circuit for the MUSE system is being actively carried out.

FIG. 1 illustrates a conventional apparatus for line-alternating interpolation of chroma signals.

In FIG. 1, through an input terminal IN, a first delay device 1 receives an external digital chroma signal and delays it for a predetermined time, and then supplies the delayed digital chroma signal as an output signal to a second delay device 2. Second delay device 2 receives the delayed digital chroma signal from first delay device 1 and delays it for the same time as that of first delay device 1, and then supplies the further delayed signal to one input terminal of an adder 3. Adder 3 is supplied with the digital chroma signal delayed by both first and second delay devices 1 and 2 through one input, and with the undelayed digital chroma signal through the other input. Therein, both digital chroma signals are added together. At this time, in view of the digital chroma signal, the digital chroma signals of three lines are placed in parallel on the same time axis.

The resultant sum of adder 3 is obtained by adding together digital chroma signals having a difference of two lines. In the MUSE system as described above, the luma signal Y and one of the two color difference signals (R-Y or B-Y) are loaded on each line, and then transmitted. As a result, the same color difference signals are added. A first multiplexer 4 is supplied with both the resultant sum from adder 3 through one input terminal A, and the output signal of first delay device 1 through the other input terminal B. Meanwhile, a second multiplexer 5 receives the output signal of first delay device 1 through one input terminal A and the resultant sum of adder 3 through the other input terminal B. Also, first and second multiplexers 4 and 5 respectively output one signal of the two received inputs in accordance with a line-alternating signal LAS.

An example of the above process is described below to further understanding.

We assume that a digital chroma signal of a third scanning line is input while continuously inputting digital chroma signals included in scanning lines through input terminal IN. Then, the signal having passed through first delay device 1 is a digital chroma signal of a second scanning line which precedes the third scanning line. The signal having passed through second delay device 2 is a digital chroma signal of a first scanning line which is delayed for two delaying periods. Therefore, the digital chroma signals of three scanning lines are arranged in parallel on the same time axis.

The signals supplied to adder 3 are the digital chroma signals of the first and third scanning lines, which are the same, since one of the chroma signals is alternately transmitted every other line in the MUSE system.

First multiplexer 4 receives the digital chroma signals of the first and third scanning lines summed in adder 3 as one input signal, and the digital chroma signal of the second scanning line output from first delay device 1 as the other input signal. In the meantime, second multiplexer 5 receives the digital chroma signal of the second scanning line output from first delay device as one input signal, and the digital chroma signals of the first and third scanning lines summed in adder 3 as the other input signal. As a result, first and second multiplexers 4 and 5 receive the output signals of first delay device 1 and adder 3, and then respectively generate selected signals in response to line-alternating signal LAS functioning as a control signal. That is, when the signal of either input A of two inputs A and B of first and second multiplexers 4 and 5 is selected in accordance with line-alternating signal LAS, first multiplexer 4 outputs the resultant sum of the digital chroma signals of the first and third scanning lines, and second multiplexer 5 outputs the digital chroma signal of the second scanning line.

As a result, the digital signals of the first and third scanning lines (which precede and succeed the second scanning line, respectively) which are not transmitted together with that of the second scanning line appear at the same time when the digital chroma signal of the present second scanning line is being output.

However, the above-described construction has a problem in that, since the interpolation is performed using the digital chroma signals of a preceding and a succeeding lines, the obtained chroma signal is dissimilar to the original color difference signal having been transmitted in a transmitter side, thereby degrading fidelity.

SUMMARY OF THE INVENTION

The present invention has been developed to solve the above-stated problem.

Accordingly, it is an object of the present invention to provide an apparatus for line-alternating interpolation of chroma signals in a decoder for a high definition television, wherein digital chroma signals being alternately input in every scanning line are processed by interpolation, using the digital chroma signals of its neighboring scanning lines, thereby enabling two digital chroma signals to be transmitted at one time when transmitting in a transmitter side.

To achieve the object of the present invention, there is provided an apparatus for line-alternating interpolation of chroma signals comprising:

a delay circuit composed of a plurality of serially connected delay devices each for delaying a color difference signal entered through an input terminal for period of one horizontal line;

operational processing means for performing a predetermined operation to restore currently untransmitted color difference signals, using color difference signals of neighboring scanning lines supplied from the delay circuit;

a phase-delay circuit for synchronizing the phase of the color difference signal supplied from the delay circuit with that of the color difference signal supplied from the operational processing means; and a multiplexing portion consisting of two multiplexers which receive and cross-select two color difference signals supplied from the phase-delay circuit and operational processing means in accordance with a line-alternating signal, and output two color difference signals at the same time:

As a result, a color difference signal more similar to the original signal can be obtained.

BRIEF DESCRIPTION OF THE DRAWINGS

The foregoing and other objects, advantages and aspects of the invention will be better understood from the following detailed description of the invention with reference to the accompanying drawings, in which.

DETAILED DESCRIPTION OF THE INVENTION

Figure 2:
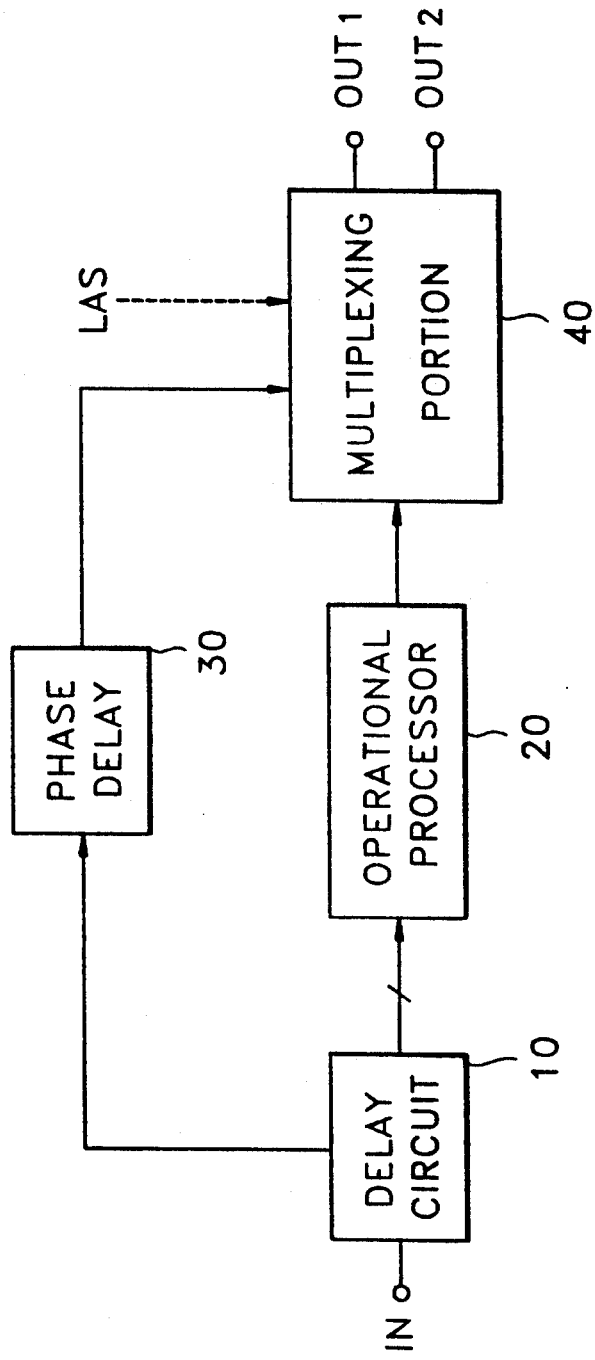
FIG. 2 shows a block diagram of an apparatus for line-alternating interpolation of chroma signals according to the present invention.

In FIG. 2 illustrating an apparatus for line-alternating interpolation of chroma signals according to the present invention, a reference numeral 10 represents a delay circuit; 20, an operational processor; 30, a phase-delay circuit; and 40, a multiplexing portion. The apparatus for line-alternating interpolation of chroma signals illustrated in FIG. 2 is composed of a delay circuit 10 for delaying a digital chroma signal input through an input terminal IN for a predetermined period; an operational processor 20 for operationally processing the digital chroma signal delayed in delay circuit 10 by a predetermined coefficient, in order to restore the other digital chroma signal which is absent on the current scanning line; a phase-delay circuit 30 for synthesizing the phase of the other digital chroma signal restored in operational processor 20 with that of the digital chroma signal on the current scanning line; and a multiplexing portion 40 for receiving and cross-selecting two digital chroma signals from phase-delay circuit 30 and operational processor 20 in accordance with line-alternating signal LAS, and simultaneously generating two digital chroma signals.

Figure 3:
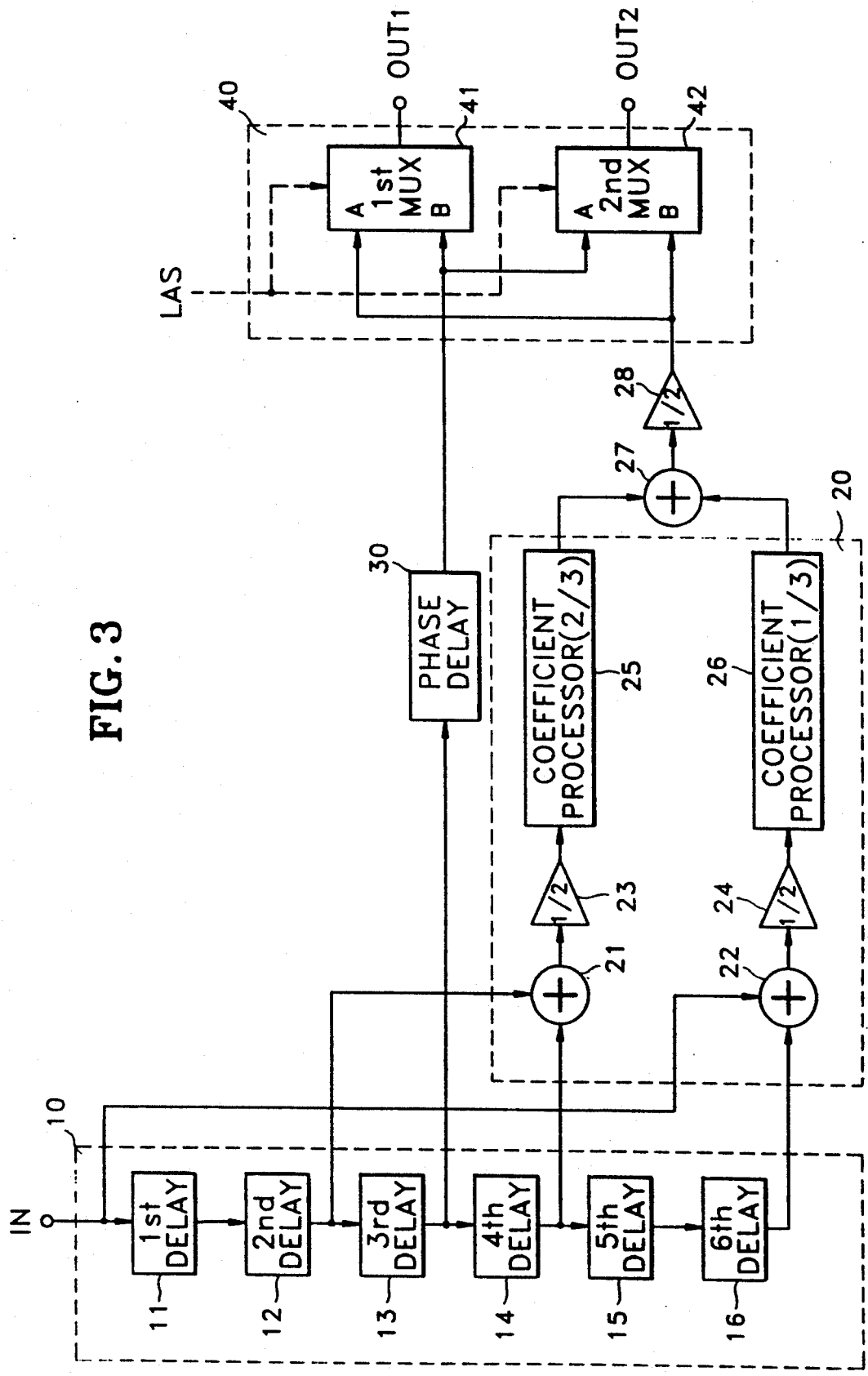
FIG. 3 shows a detailed block diagram of FIG. 2.

FIG. 3 is a detailed block diagram of the apparatus for line-alternating interpolation of chroma signals shown in FIG. 2.

Figure 1:
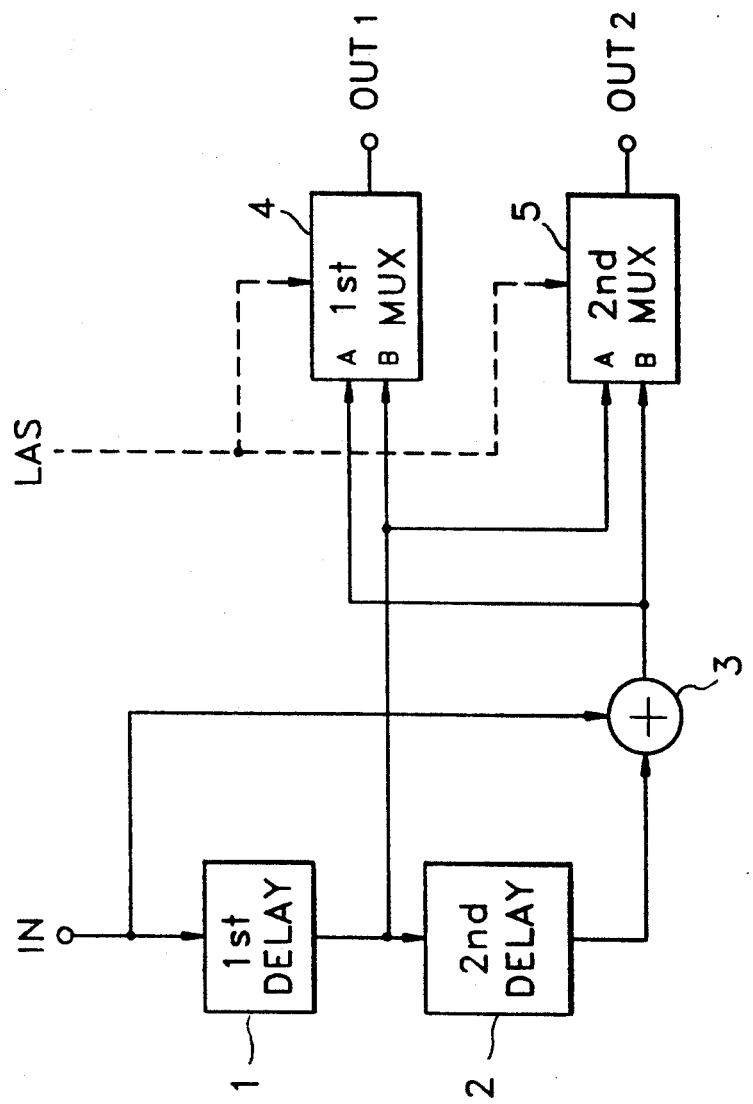
FIG. 1 shows a block diagram of a conventional apparatus for line-alternating interpolation of chroma signals.

Here, reference numerals 11 through 16 designate first through sixth delay devices which form delay circuit 10 of FIG. 1. Also, reference numerals 21, 22, and 27 are first, second and third adders; 23, 24, and 28 are first, second and third multipliers; and 25 and 26 are first and second pixel-weight coefficient processors. These first, second and third adders 21, 22 and 27 and multipliers 23, 24 and 28 together with first and second pixel weight coefficient processors 25 and 26 constitute operational processor 20. Reference numerals 41 and 42 are first and second multiplexers, forming multiplexing portion 40.

First through sixth delay devices 11–16 of delay circuit 10 each delays a digital chroma signal input through an input terminal IN by period of one horizontal scanning line (1H).

also, the operational processor 20 shown in FIG. 3 comprises a first adder 21 for summing the output signals from a second and a fourth delay devices 12 and 14 of delay circuit 10 and a second adder 22 for summing the output signal of a sixth delay device 16 and the color difference signal input through the input terminal IN. The operational processor 20 further comprises first and second multipliers 23 and 24 for receiving signals added in first and second adders 21 and 22 and respectively multiplying by predetermined coefficients to the received signals. A first pixel-weight coefficient processor 25 is also provided for receiving an output signal of first multiplier 23 and multiplying a first predetermined coefficient to the output signal and a second pixel-weight coefficient processor 26 for receiving an output signal from second multiplier 24 and multiplying a second predetermined coefficient smaller than the first predetermined coefficient to the output signal. A third adder 27 is also provided for summing the output signals from first and second pixel-weight coefficient processor 25 and 26. A third multiplier 28 is provided for receiving the resultant sum of third adder 27 and multiplying the resultant sum by a predetermined coefficient.

First adder 21 of operational processor 20 receives the output signal of second delay device 12 as one input, and the output signal of fourth delay device 14 as the other input, and then adds both the received signals to supply the resultant sum to first multiplier 23.

Second adder 22 receives a digital chroma signal input through an input terminal IN as one input, and the output signal of sixth delay device 16 as the other input, and then adds both the received signals to supply the resultant sum to second multiplier 24.

First and second multiplier 23 and 24 each multiplies ½ to digital chroma signals synthesized in first and second adders 21 and 22, and supplies the digital chroma signals decreased by ½ to pixel-weight coefficient processors 25 and 26. Then, pixel-weight coefficient processors 25 and 26 respectively multiply ⅜ and ⅛ to the signals supplied from first and second multipliers 23 and 24, and supplies the products to third adder 27.

The resultant sum of third adder 27 is multiplied by ½ in third multiplier 28, and then is supplied to multiplexing portion 40. After passing through phase-delay circuit 30 so as to adjust the phase difference resulting from operational processing in operation process 20, the output signal of third delay device 13 in delay circuit 10 is supplied to multiplexing portion 40. Phase-delay circuit 30 and operational processor 20 are respectively connected to first and second multiplexers 41 and 42 of multiplexing portion 40, such that cross-switched can occur.

That is, first and second multiplexers 41 and 42 each outputs a signal of a selected input terminal in response to line-alternating signal LAS. This is accomplished by allowing the output signal of phase-delay circuit 30 to be supplied to both input terminal B of first multiplexer 41 and input terminal A of second multiplexer 42, and the output signal of operational processor 20 to be supplied to both input terminal A of first multiplexer 41 and input terminal B of second multiplexer 42.

To further the understanding of the operation of the apparatus according to the present invention, an example is given as follows.

In FIG. 3, digital chroma signals on a plurality of scanning lines are continuously supplied to input terminal IN. At this time, chroma signals are alternately input on every other scanning line.

The applied digital chroma signal is delayed for one horizontal scanning period by each of delay devices 11–16. For example, it is assumed the input signal is the digital chroma signal on the seventh scanning line, then the output signal of sixth delay device 16 is the digital chroma signal of the first scanning line; that of fifth delay device 15 is of the second scanning line; that of fourth delay device 14 is of the third scanning line; that of third delay device 13 is of the fourth scanning line; that of second delay device 12 is of the fifth scanning line; and that of first delay device 11 is of the sixth scanning line.

Here, if the delay devices constituting delay circuit 10 number below six, the filter characteristic is degraded, so that the received RGB or composite video signal is greatly different from the original color transmitted. Meanwhile, more than six delay devices do not further enhance the efficiency of the filter, but merely increases the cost. However, more than six delay devices may be used.

In one embodiment, an assumption will be made that the digital chroma signal of an odd scanning line is the R-Y signal, and that of an even scanning line is the B-Y signal.

The signals applied to first adder 21 are the R-Y signals, that is, the output signals from second and fourth delay devices 12 and 14, and the signals applied to second adder 22 are the digital chroma signal input through input terminal IN and the output signal of sixth delay device 16, which are also R-Y signals.

By using the characteristic of video signals having correlation between adjacent pixels, the output signals from second and fourth delay devices 12 and 14 are added together in first adder 21, which are the signals most similar to the digital chroma signal of the currently transmitting scanning line. This is performed for restoring the signal closest to the original color by heightening fidelity. Also, in second adder 22, the digital chroma signal input through input terminal IN, is summed with the output signal from sixth delay device 16, which is dissimilar to the currently transmitting digital chroma signal.

The resultant sums in first and second adders 21 and 22 are multiplied in corresponding multipliers 23 and 24 by $\frac{1}{2}$, and then each supplied to first and second pixel-weight coefficient processors 25 and 26, respectively.

Then, the signal from first multiplier 23 is multiplied by $\frac{3}{4}$ in first pixel-weight coefficient processor 25, and the signal from second multiplier 24 is multiplied by $\frac{1}{4}$ in second pixel-weight coefficient processor 26. Here, first and second pixel-weight coefficient processors 25 and 26 are ROMs or the sum of operational devices. The reason for taking different coefficients in first and second pixel-weight coefficient processors 25 and 26 is to strengthen the weight applied on the signal with greater correlation of the digital chroma signals of the currently transmitting scanning lines, and to weaken the weight applied on the signal with less correlation, so that the untransmitted digital chroma signal is restored to be more similar to the original color.

While restoring the untransmitted digital chroma signal in operational processor 20, the digital chroma signal of the currently transmitting scanning line which is the output signal from third delay device 13 of delay circuit 10, remains latched in phase-delay circuit 30. Therefore, the signals output from phase-delay circuit 30 and operational processor 20 of the same phase are simultaneously supplied to multiplexing portion 40. At this time, the signal from phase-delay portion 30 is the B-Y signal, and the signal from operational processor 20 is the R-Y signal.

As a result, multiplexing portion 40 performs cross-switching in accordance with line-alternating signal LAS, and then simultaneously obtains the two color difference signals R-Y and B-Y.

As described above, according to the apparatus for line-alternating interpolation of chroma signals, the filtering effect is enhanced using a plurality of delay devices and pixel-weight coefficient processors having different coefficients, thereby obtaining a color difference component more similar to the original chroma signal.

In more detail, according to the apparatus for line-alternating interpolation of chroma signals of the present invention, using a color difference signal of a currently transmitting scanning line in a MUSE decoder for a high definition television, a color difference signal of an untransmitted scanning line is restored, so that the color difference signals are transmitted at the same time. The color difference signal which is alternately entered through an input terminal per every scanning line is delayed by periods of one horizontal scanning line. Then, the two signals most similar to the transmitted color difference signal among the delayed color difference signals are added together, and the two most different signals are also added together, so that the greater weight is given to the resultant sum of the similar signals, thereby restoring the untransmitted color difference signal. Therefore, two color difference signals more similar to the original color difference signals are formed to be simultaneously transmitted.

What is claimed is:

1. An apparatus for line-alternating interpolation of chroma signals, said apparatus comprising:
   (a) a delay circuit comprising a plurality of serially connected delay devices each for delaying color difference signals entered through an input terminal for a period of one horizontal scanning line;
   (b) an operational processing means performing a predetermined operation for restoring currently untransmitted color difference signals using color difference signals of predetermined scanning lines input into said operational processing means from predetermined delay devices from said delay circuit, said operational processing means outputting a restored color difference signal;

(c) a phase-delay for synchronizing the phase of a predetermined color difference signal from said delay circuit with the phase of said restored color difference signal; and (d) multiplexing means comprising two multiplexers for inputting the color difference signal supplied from said phase-delay circuit and the color difference signal supplied from said operational processing means and for cross-selecting the color difference signals in accordance with a line-alternating signal and for outputting the color difference signals at the same time, thereby obtaining a color difference signal more similar to an original color difference signal.

2. An apparatus for line-alternating interpolation of chroma signals as claimed in claim 1, wherein said delay circuit comprises first through sixth delay devices which are serially connected.

3. An apparatus for line-alternating interpolation of chroma signals as claimed in claim 2, wherein said operational processing means comprises:

a first adder for summing the output signals from a second and a fourth delay devices of said delay circuit;

a second adder for summing the output signal of a sixth delay device and said color difference signal input through said input terminal;

first and second multipliers for receiving signals added in said first and second adders and respectively multiplying predetermined coefficients to said signals received from said first and second adders;

a first pixel-weight coefficient processor for receiving an output signal of said first multiplier and multiplying a first predetermined coefficient to said output signal;

a second pixel-weight coefficient processor for receiving an output signal from said second multiplier and multiplying a second predetermined coefficient smaller than said first predetermined coefficient to said output signal;

a third adder for summing the output signals from said first and second pixel-weight coefficient processors; and a third multiplier for receiving the resultant sum of said third adder and multiplying said resultant sum by a predetermined coefficient.

* * * * *